United States Patent [19]
Merrill

[11] 3,735,523
[45] May 29, 1973

[54] FISHING SINKERS
[75] Inventor: Richard L. Merrill, King City, Calif.
[73] Assignee: The Lee, Raymond Organization, Inc., New York, N.Y.
[22] Filed: Jan. 25, 1971
[21] Appl. No.: 109,302

[52] U.S. Cl. ............................................. 43/44.96
[51] Int. Cl. .............................................. A01k 91/00
[58] Field of Search ..................... 43/34, 35, 36, 37, 43/44.96, 44.97, 42.4, 42.41, 43.2, 43.4

[56] References Cited
UNITED STATES PATENTS

| 13,081 | 6/1855 | Cook | 43/36 |
| 1,172,780 | 2/1916 | Ferree | 43/36 |
| 1,583,795 | 5/1926 | Pasturzak | 43/44.96 |

Primary Examiner—Louis G. Mancene
Attorney—Alan Harold Hedegard

[57] ABSTRACT

An elongated hollow tube has one flared end and an opposite conically shaped end. A rod extends axially through the tube with one end extending beyond the conically shaped tube end and having an eye. A lead weight is disposed within the tube adjacent the conical end. Tines extend through the flared end and guide grooves to a steel ring in the tube and slidable along the rod. A coil spring is disposed in the tube concentrically about the rod betwen disc and weight.

4 Claims, 4 Drawing Figures

INVENTOR
RICHARD L. MERRILL

INVENTOR
RICHARD L. MERRILL

FISHING SINKERS

SUMMARY OF THE INVENTION

My sinker comprises a hollow elongated tube with one end having the shape of an outwardly extending inwardly tapering cone, and with an opposite flared end. A rod extends axially in the tube being secured at the flared end to a guide and extending through the cone end to terminate in an eye adapted to be secured to the fishing line carried by a rod. Tines extend through the flared end of the tube into grooves in the side of the guide to be secured to a ring disposed in the tube and slidable back and forth on the rod. A cylindrical weight having an axial bore is disposed fixed in the tube with the rod passing through the bore. A compression coil spring disposed concentrically in the tube about the rod bears against both weight and a disc.

My sinker uses the force of water against the rear of sinker to bury the tines into bottom of river, stream or ocean, therefore preventing it from being washed ashore. It allows the fisherman to keep his bait in the exact area he wishes, even in swift water. In the event any one or combination of tines become ensnared the fishing line attached to the rod can be tightened to a predetermined amount retracting the tines into tube thereby releasing it from the ensnarement. When tension on the line is released the tines once again extend and the sinker is again active and retains itself to the bottom. The amount of tension required to retract the tines will be determined by the length and strength of the compression spring and the material of the tines. The smaller the size of spring steel used for the tines, the less tension required for them to retract into the tube. The flat tube end keeps the tines evenly spaced. Another means of releasing the fishing sinker from its ensnarement is by pulling the fishing line until the tines are drawn into the tube, then quickly releasing the tension on the fishing line. This allows the spring to thrust the tines rearward and causes the tube to jerk rearward, when the tines become fully extended, because of their rearward momentum. The heavier the tines, the greater will be the rearward momentum generated by this maneuver.

The body of the fishing sinker can be constructed with or without a flared end. Although a flared end seems preferred because of decreasing drag on the tines.

The size and weight of present sinkers required to stay secured in fast water make them easy to get ensnared and as a result most times lost. This is of great expense to fishermen everywhere. My sinker can be far smaller and still retain itself where cast and also can be released from ensnarement. The savings to fishermen can be tremendous.

The purpose of this sinker is greater efficiency than present sinkers with much more economy to the fisherman.

DETAILED DESCRIPTION OF PREFERRED EMBODIMENTS

Figure 1:
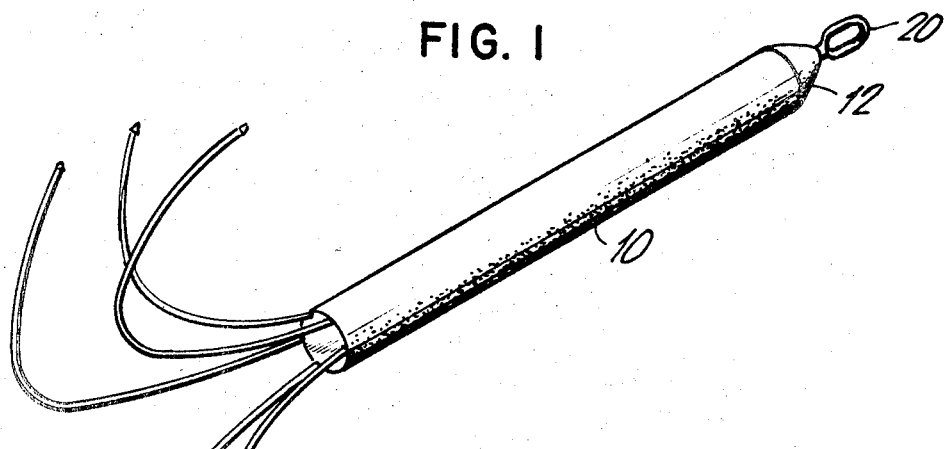
FIG. 1 is a perspective view of my invention.
Figure 3:
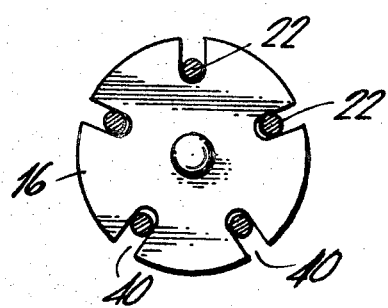
FIG. 3 is a view taken along line 3—3 in FIG. 2.
Figure 2:
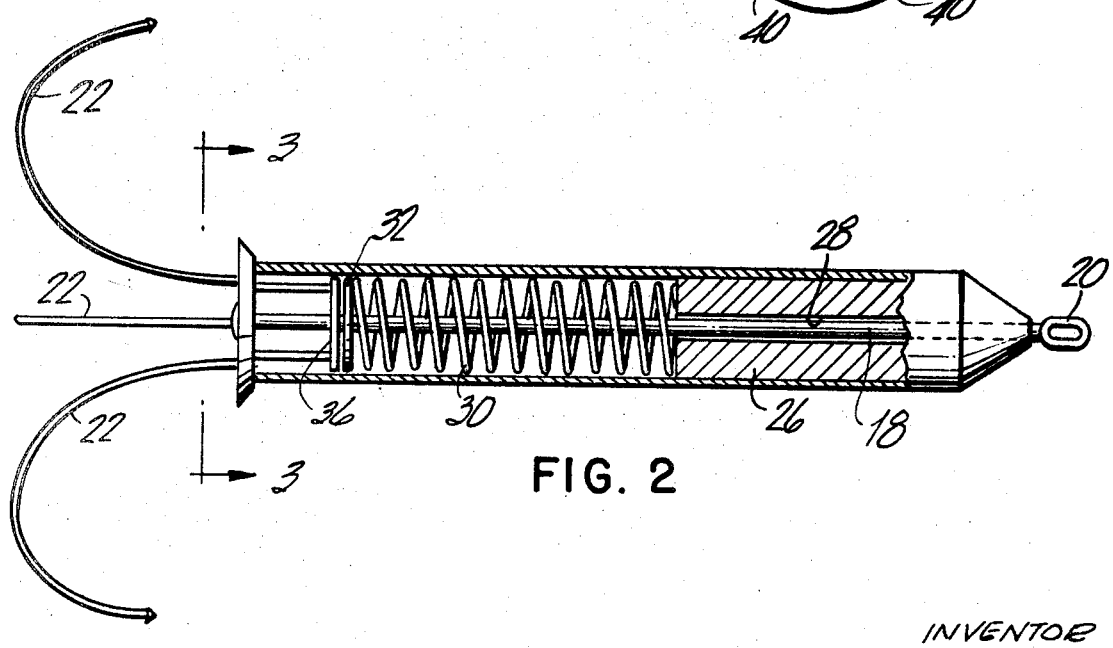
FIG. 2 is a cross sectional view thereof.
Figure 4:
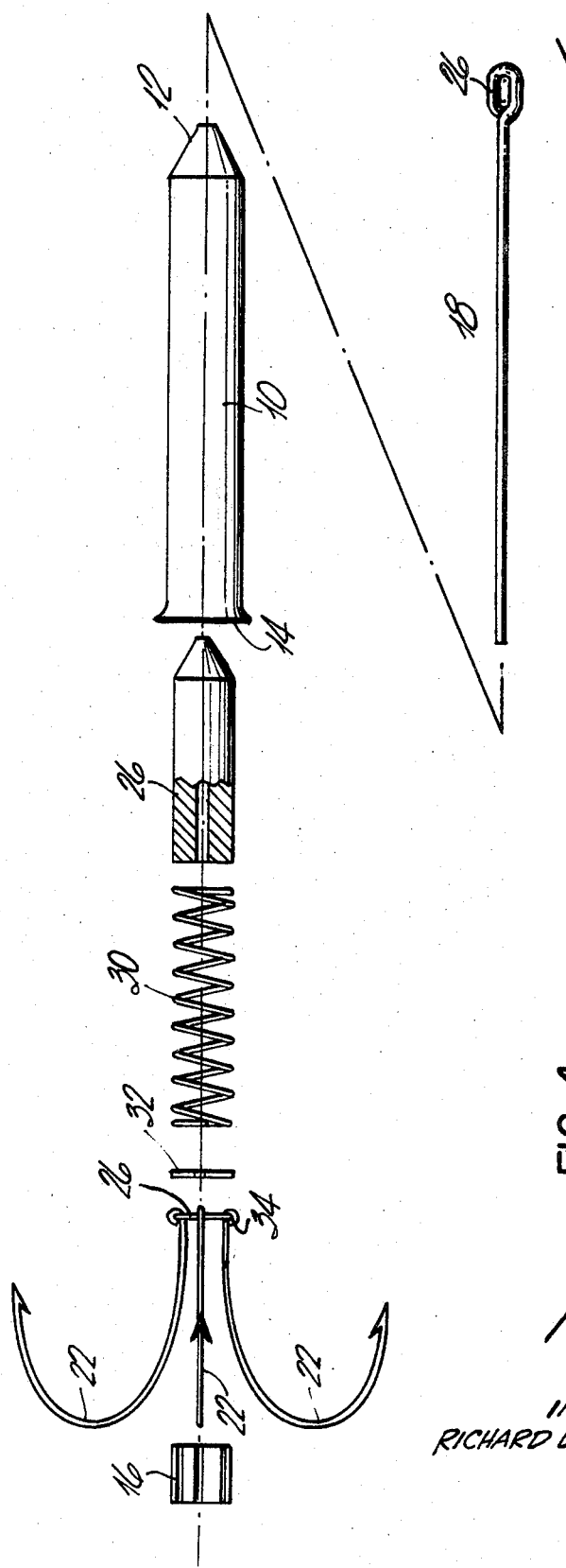
FIG. 4 is an exploded view of my invention.

Referring now to FIGS. 1-3, a hollow elongated tube 10 has a front end 12 conical in shape and a flared rear end 14. A rod 18 extends axially within the tube with one end extending out of end 12 and terminating in an eye 20 to which a fishing line can be attached. The other end of the rod is secured to the center of guide 16. The lower shoulder of the eye rests against end 12 and acts as a stop to prevent guide 16 from coming out of flared end 14. Five tines 22 each pass through openings in the guide with eyes 34 at one end passing through ring 36 disposed in the guide.

A cylindrical lead weight 26 is disposed in the tube adjacent end 12 in fixed position and has an axial bore 28 through which the rod extends. A coil compression spring 30 is disposed in the tube concentrically about the rod with one end of the spring bearing against the weight and the other end being secured to a washer 32 bearing against ring 36. Washer 32 has an enlarged hole through which the rod extends to permit the washer to move back and forth and is disposed between the spring and ring to prevent binding. The guide is a solid with axial grooves 40 running the full length. This keeps the tines equally spaced and guides them as they are retracted and extended. The guide is fixed to the rod by bradding or riveting. The flared end cuts down drag on the tines for easier retraction and extension.

The sinker functions in the manner previously described.

While I have described my invention with particular reference to the drawings, such is not to be considered as limiting its actual scope.

Having thus described this invention, what is asserted as new is:

1. A sinker comprising:
   a hollow elongated tube with one end having the shape of an outwardly extending inwardly tapering cone and an opposite flared end;
   a guide in said flared end and having grooves;
   a plurality of tines disposed partially outside the flared end and extending partially along said grooves into the tube interior; and
   means disposed in said tube to spring bias said tines outward and rearward.

2. A sinker as set forth in claim 1 further including a weight disposed in the cone end and extending to a point intermediate the ends of the tube, said weight being fixed in position.

3. A sinker as set forth in claim 2 further including a rod extending axially through said tube from a point outside the cone end to the flared end, said tines being secured to a ring, said ring being in the tube and slidable back and forth along the rod.

4. A sinker as set forth in claim 3 wherein said means is a coil spring disposed concentrically about the rod and extending between ring and weight.

* * * * *